(12) United States Patent
Lee et al.

(10) Patent No.: US 7,897,714 B2
(45) Date of Patent: Mar. 1, 2011

(54) SILICONE FINE PARTICLES, METHOD FOR PREPARING THE SAME, AND THERMOPLASTIC RESIN COMPOSITION USING THE SAME

(75) Inventors: Han Su Lee, Seoul (KR); Ju Sung Kim, Suwon-si (KR); Jin Gyu Park, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 258 days.

(21) Appl. No.: 11/923,859

(22) Filed: Oct. 25, 2007

(65) Prior Publication Data

US 2008/0124549 A1 May 29, 2008

(30) Foreign Application Priority Data

Nov. 23, 2006 (KR) ...................... 10-2006-0116549

(51) Int. Cl.
*C08G 77/06* (2006.01)
*C08G 77/14* (2006.01)
*C08L 83/04* (2006.01)

(52) U.S. Cl. ........................................ 528/21; 525/100
(58) Field of Classification Search .................. 525/100
See application file for complete search history.

(56) References Cited

U.S. PATENT DOCUMENTS

| | | | | |
|---|---|---|---|---|
| 3,624,030 A | * | 11/1971 | Pruvost et al. .................. | 528/31 |
| 3,666,830 A | * | 5/1972 | Alekna ......................... | 525/477 |
| 3,792,012 A | * | 2/1974 | Zdaniewski ................... | 523/213 |
| 3,839,280 A | * | 10/1974 | Zdaniewski ................... | 525/474 |
| 4,528,390 A | * | 7/1985 | Kimura ......................... | 556/450 |
| 4,652,618 A | * | 3/1987 | Sumida et al. .............. | 525/478 |
| 4,778,624 A | | 10/1988 | Ohashi et al. | |
| 4,871,616 A | * | 10/1989 | Kimura et al. .............. | 428/407 |
| 4,892,726 A | * | 1/1990 | Yonekura et al. .............. | 424/63 |
| 4,895,914 A | * | 1/1990 | Saitoh et al. ................. | 525/478 |
| 4,996,257 A | * | 2/1991 | Saito et al. ................... | 524/262 |
| 5,352,747 A | * | 10/1994 | Ohtsuka et al. .............. | 525/464 |
| 5,372,879 A | * | 12/1994 | Handa et al. ................. | 428/327 |
| 5,622,806 A | * | 4/1997 | Veregin et al. ......... | 430/137.11 |
| 5,712,072 A | * | 1/1998 | Inaba et al. ............... | 430/108.4 |
| 5,801,262 A | * | 9/1998 | Adams ........................ | 556/450 |
| 5,936,031 A | * | 8/1999 | Woodgate et al. ........... | 524/745 |
| 6,245,852 B1 | * | 6/2001 | Hasegawa et al. ............ | 524/837 |
| 6,753,399 B2 | * | 6/2004 | Inokuchi ...................... | 528/14 |
| 6,773,787 B2 | * | 8/2004 | Maas et al. .................. | 428/141 |
| 7,297,380 B2 | * | 11/2007 | Coenjarts et al. ............. | 428/1.3 |
| 2005/0238984 A1 | * | 10/2005 | Kaburagi et al. ......... | 430/109.1 |
| 2006/0270773 A1 | * | 11/2006 | Hale et al. ................... | 524/423 |
| 2006/0290253 A1 | * | 12/2006 | Yeo et al. ..................... | 313/116 |
| 2007/0020917 A1 | * | 1/2007 | Brook et al. .................. | 438/622 |
| 2007/0286837 A1 | * | 12/2007 | Torgerson et al. ....... | 424/70.122 |

FOREIGN PATENT DOCUMENTS

| | | | |
|---|---|---|---|
| DE | 3905785 A1 | | 8/1989 |
| EP | 1361252 A1 | * | 11/2003 |
| GB | 2216535 A | | 11/1989 |
| JP | 1095382 | | 6/1979 |
| JP | 63077940 A | | 4/1988 |
| JP | 10045914 | | 2/1998 |
| JP | 2000186148 | | 7/2000 |

OTHER PUBLICATIONS http://www.chemicalland21.com/arokorhi/industrialchem/organic/ETHYLENEDIAMINE.htm, published on the web on May 27, 2005.*
German Office Action in counterpart German Application No. 10 2007 055 631.6-44, dated Aug. 27, 2009.

* cited by examiner

*Primary Examiner*—Randy Gulakowski
*Assistant Examiner*—Robert Loewe
(74) *Attorney, Agent, or Firm*—Summa, Additon & Ashe, P.A.

(57) ABSTRACT

One aspect of the invention relates to a method of preparing silicone fine particles which comprises preparing a mixture comprising an organotrialkoxysilane and an organochlorosilane to give a concentration of the organochlorosilane in the mixture of about 100 to about 2,000 ppm; mixing the mixture with water to prepare a sol solution; and maintaining a pH value of the sol solution within a range of about 8 to about 11. Another aspect of the invention relates to a thermoplastic resin composition which employs the silicone fine particles as a diffuser.

11 Claims, No Drawings

SILICONE FINE PARTICLES, METHOD FOR PREPARING THE SAME, AND THERMOPLASTIC RESIN COMPOSITION USING THE SAME

CROSS-REFERENCE TO RELATED APPLICATIONS

This non-provisional application claims priority under 35 USC Section 119 from Korean Patent Application No. 2006-116549, filed on Nov. 23, 2006, which is hereby incorporated by reference in its entirety.

FIELD OF THE INVENTION

The present invention relates to a method for preparing silicone fine particles. More particularly, the present invention relates to a novel method for preparing polyorganosilsesquioxane fine particles, silicone fine particles produced therefrom and a thermoplastic resin composition including the same.

BACKGROUND OF THE INVENTION

Silicone fine particles such as silica, polyorganosilsesquioxane particles, and the like, are widely used in various industries. Among these, polyorganosilsesquioxane fine particles are widely used as additives for resin or coating agents because of their good compatibility with polymer materials or organic solvents. Recently, polyorganosilsesquioxane fine particles have received attention as light diffusing agents for light diffuser plates in LCD-TVs, because of their low refractive index and good compatibility with resins. These silicone fine particles can be prepared by a conventional sol-gel process. The production cost, however, of the conventional sol-gel process can be high, because it requires expensive monomer and its yield per time unit is low.

Japanese Patent No. 1,095,382 discloses a method for producing polymethylsilsesquioxane by hydrolysis and condensation reaction of methyltrialkoxysilane having a chlorine content of 0.1~5%. It can be difficult, however, to control the reaction rate in this process because of the high concentration of chlorine. Further, hydrogen chloride can intensify corrosion in the reactor, which can make its use impractical.

Japanese Patent Laid-Open Nos. 1998-045914 and 2000-186148 disclose a process for producing polyorganosilsesquioxane fine particles by hydrolyzing a mixture of water and methyltrialkoxysilane which does not contain chlorine in the presence of a catalyst such as an organic acid or an inorganic acid, and adding an aqueous alkaline solution thereto to effect a condensation reaction. These methods employ high purity methyltrialkoxysilane, which requires a separate refinery process, and need a hydrolysis catalyst. As a result, these methods can be expensive.

SUMMARY OF THE INVENTION

The present invention provides an easy and cost effective method for preparing polyorganosilsesquioxane fine particles. In one aspect of the invention, the method comprises: preparing a mixture of an organotrialkoxysilane and an organochlorosilane to give a concentration of the organochlorosilane in the mixture of about 100 to about 2,000 ppm; mixing the mixture with water to prepare a sol solution; and maintaining a pH value of the sol solution within a range of about 8 to about 11. In various embodiments of the invention, a transparent sol can be prepared in a short amount of time by mixing the organotrialkoxysilane and water using a high-efficiency mixer. The organotrialkoxysilane and water can also be mixed in the presence of an organochlorosilane as a catalyst obtained as a by-product in the synthesis of organoalkoxysilane.

Another aspect of the invention provides a thermoplastic resin composition which employs the silicone fine particles as a diffuser.

Another aspect of the invention relates to a light diffuser plate molded from the thermoplastic resin composition. The light diffuser plate may have good luminance and light resistance.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

One aspect of the invention relates to silicone fine particles. The silicone fine particles can be obtained by preparing a mixture comprising an organotrialkoxysilane and an organochlorosilane, mixing the mixture with water to prepare a sol solution, and maintaining a pH value of the sol solution within a range of about 8 to about 11.

The organotrialkoxysilane can be represented by the following chemical Formula (I):

$$R^1Si(OR^2)_3 \qquad (I)$$

wherein $R^1$ represents an alkyl group having 1 to 6 carbon atoms, a vinyl group, or an aryl group having 5 to 30 carbon atoms, and $R^2$ is an alkyl group having 1 to 5 carbon atoms. $R^1$ can be, for example, a methyl group, ethyl group or phenyl group, and $R^2$ can be, for example, a methyl group, ethyl group, propyl group or butyl group. Organotrialkoxysilanes of Formula (I) in which $R^1$ and $R^2$ are each a methyl group can be particularly useful in many industrial applications.

The organochlorosilane of the present invention can be represented by the following chemical Formula (II):

$$R^1Si(OR^2)_{3-x}Cl_x \qquad (II)$$

wherein $R^1$ represents an alkyl group having 1 to 6 carbon atoms, a vinyl group, or an aryl group having 5 to 30 carbon atoms, $R^2$ is an alkyl group having 1 to 5 carbon atoms, and x is 1 to 3. $R^1$ can be, for example, a methyl group, ethyl group or phenyl group, and $R^2$ can be, for example, a methyl group, ethyl group, propyl group or butyl group. Organochlorosilanes of Formula II in which $R^1$ and $R^2$ are each a methyl group can be particularly useful in many industrial applications.

In one embodiment, the organochlorosilane may be organotrichlorosilane in which all alkoxy groups are substituted with a chlorine group.

The organochlorosilane is mixed with the organotrialkoxysilane to give an organochlorosilane concentration of about 100 to about 2,000 ppm, for example, about 300 to about 1,500 ppm. If the concentration of organochlorosilane in the mixture is less than about 100 ppm, it may be difficult to make fine particles having a desired particle diameter because sufficient hydrolysis does not take place even under high shear mixing conditions. On the other hand, if the concentration of organochlorosilane in the mixture is more than about 2,000 ppm, it is difficult to control the hydrolysis rate, which can make it difficult to produce particles having a desired particle diameter. Such a high concentration may also result in gelation. Further an excessively high concentration of chlorine can cause other problems, such as impurities and reactor corrosion.

The mixture of the organochlorosilane and the organotrialkoxysilane can be mixed with water by means of a high-efficiency mixer to obtain a transparent sol. In the mixing process, mix efficiency is particularly important because the organochlorosilane in which about 100 to about 2,000 ppm of alkoxy group is substituted with chlorine group can reduce the hydrolysis rate. Thus, it is necessary to maintain a sufficiently high reaction surface between organotrialkoxysilane and water by using a high-efficiency mixer.

Conventional mixers such as anchor, pfaudler, paddle, propeller and ribbon type impeller have a low mixing efficiency. As a result, the amount of the reaction catalyst for hydrolysis, reaction temperature and reaction time may increase, which can increase production costs and impurities. Further, it is necessary to increase stirring rate. However, such a high stirring rate may increase production costs and foam occurrence, which can make the process impractical and make it difficult to control the particle size distribution.

In one embodiment, the transparent sol may be prepared by means of a high-efficiency mixer. Examples of the high-efficiency mixer may include high-speed emulsion/dispersion equipment such as a homo-mixer, a homogenizer, a microfluidizer or a combination of flat impeller and baffle plate mixer. These homo-mixer, homogenizer and microfluidizer make it possible to obtain high efficiency mixing and liquid-liquid mixing in a short time by using high shear force, impact force and shock waves from cavitation.

The homo-mixer can be conducted under a condition of at least about 5,000 rpm, for example at least about 7,000 rpm. The homogenizer or the microfluidizer are conducted at a pressure of at least about 5,000 psi, for example at least about 7,000 psi. The combination of flat impeller and baffle plate mixer makes it possible to achieve efficient mixing even at a low stirring speed.

In one embodiment, the combination of a flat impeller having a width that is at least about 50% of an inner diameter of a reactor and stirring equipment having a plurality of baffle plates oriented in a longitudinal direction of a reactor is employed. A flat impeller having holes parallel to a stirring shaft may be used.

The organotrialkoxysilane can be used in an amount of about 5 to about 50% by weight relative to the weight of sol solution, for example about 10 to about 30% by weight in view of ease in controlling an average particle diameter and reaction yield.

The pH of the transparent sol solution is adjusted to within a range of about 8 to about 11 to obtain polyorganosilsesquioxane fine particles. If the pH of the transparent sol solution is less than about 8, it is difficult to obtain fine particles, or it takes a very long time to form fine particles. On the other hand, if the pH of the transparent sol solution is more than about 11, the fine particles obtained therefrom may be dissolved. The pH of the transparent sol solution can be adjusted to within a range of about 9 to about 10. Conventional basic aqueous solutions can be used in order to control the pH of about 8 to about 11. Examples of aqueous alkaline solutions useful in the invention include without limitation alkali metal, alkali earth metal, hydrogen carbonate, ammonia, and the like, and mixtures thereof.

The sol solution may be filtered, washed and dried to obtain final fine particles. A spray dryer or spin flash dryer can be useful for preventing particles from agglomerating with each other to provide fine particles in a powdery state without a scattering process.

The polyorganosilsesquioxane fine particles obtained therefrom may have a an average particle size of about 0.1 to about 10 μm. The polyorganosilsesquioxane fine particles can be used as a light diffuser.

Another aspect of the invention provides a thermoplastic resin composition for light diffuser plate comprising the foregoing polyorganosilsesquioxane fine particles The thermoplastic resin composition comprises polyorganosilsesquioxane fine particles produced by the foregoing method and thermoplastic resin.

The polyorganosilsesquioxane fine particles may have an average particle diameter of about 2.5 to about 3.5 μm. When polyorganosilsesquioxane fine particles having an average particle diameter of about 2.5 to about 3.5 μm are used as a light diffuser, the light diffuser plate obtained therefrom may have excellent transmittance, haze, luminance, light resistance, and the like.

Examples of the thermoplastic resin may include without limitation vinyl chloride resins, styrene resins, styrene-acrylonitrile copolymer resin, acrylic resins, acryl-styrene resins, polyester resins, ABS resins, polycarbonate resins, and the like, and mixtures thereof.

In some embodiments, the thermoplastic resin composition may comprise a thermoplastic resin such as polystyrene, polymethyl methacrylate, poly(methyl methacrylate-styrene) copolymer, polycarbonate resin and polyorganosilsesquioxane fine particles having an average particle diameter of about 2.5 to about 3.5 μm.

In some embodiments, the polyorganosilsesquioxane fine particles are used in an amount of about 0.1 to about 10 parts by weight, for example about 0.1 to about 2 parts by weight per 100 parts by weight of the thermoplastic resin.

The thermoplastic resin composition obtained thereby can be molded by a conventional process and may be used as a light diffuser plate for a LCD-TV.

The present invention may be better understood by reference to the following examples that are intended for the purpose of illustration and are not to be construed as in any way limiting the scope of the present invention, which is defined in the claims appended hereto.

EXAMPLE

Example 1

Methyl trichlorosilane is mixed with methyltrimethoxysilane to prepare a mixed solution in which the content of the methyl trichlorosilane is 500 ppm. To 200 g of the mixed solution is added 1,800 g of ion-exchanged water and mixed. The mixed solution is subjected to a high speed mixing for 1 minute at 10,000 rpm using a homo-mixer. To the resulting mixture is added aqueous ammonia to adjust the pH value of 9.7, then the mixture is allowed to stand at room temperature for 4 hours. The resultant is filtered and washed, followed by drying with a spray dryer to obtain white fine particles.

Example 2

Methyl trichlorosilane is mixed with methyltrimethoxysilane to prepare a mixed solution in which the content of the methyl trichlorosilane is 500 ppm. To 280 g of the mixed solution is added 1,720 g of ion-exchanged water and mixed. The mixed solution is subjected to a high speed mixing for 1 minute at 10,000 rpm using a homo-mixer. To the resulting mixture is added aqueous ammonia to adjust the pH value of 9.6, then the mixture is allowed to stand at room temperature for 4 hours. The resultant is filtered and washed, followed by drying with a spray dryer to obtain white fine particles.

Example 3

Methyl trichlorosilane is mixed with methyltrimethoxysilane to prepare a mixed solution in which the content of the methyl trichlorosilane is 500 ppm. To 400 g of the mixed solution is added 1,600 g of ion-exchanged water and mixed. The mixed solution is subjected to a high speed mixing for 1 minute at 10,000 rpm using a homo-mixer. To the resulting mixture is added aqueous ammonia to adjust the pH value of 9.6, then the mixture is allowed to stand at room temperature for 4 hours. The resultant is filtered and washed, followed by drying with a spray dryer to obtain white fine particles.

Example 4

Methyl trichlorosilane is mixed with methyltrimethoxysilane to prepare a mixed solution in which the content of the methyl trichlorosilane is 500 ppm. To 200 g of the mixed solution is added 1,800 g of ion-exchanged water and mixed. The mixed solution is treated at one time with a microfluidizer at a pressure of 10,000 psi. To the resulting mixture is added aqueous ammonia to adjust the pH value of 9.7, then the mixture is allowed to stand at room temperature for 4 hours. The resultant is filtered and washed, followed by drying with a spray dryer to obtain white fine particles.

Example 5

Methyl trichlorosilane is mixed with methyltrimethoxysilane to prepare a mixed solution in which the content of the methyl trichlorosilane is 500 ppm. To 200 g of the mixed solution is added 1,800 g of ion-exchanged water and mixed. The mixed solution is subjected to a high speed mixing for 1 minute at 10,000 rpm using a homo-mixer and is treated at one time with a microfluidizer at a pressure of 10,000 psi subsequently. To the resulting mixture is added aqueous ammonia to adjust the pH value of 9.7, then the mixture is allowed to stand at room temperature for 4 hours. The resultant is filtered and washed, followed by drying with a spray dryer to obtain white fine particles.

Example 6

Methyl trichlorosilane is mixed with methyltrimethoxysilane to prepare a mixed solution in which the content of the methyl trichlorosilane is 500 ppm. To 280 g of the mixed solution is added 1,720 g of ion-exchanged water and mixed. The mixed solution is then transferred to a glass reactor equipped with a baffle plate and subjected to a mixing for 30 minutes at 70 rpm using a flat impeller having a width that is 60% of an inner diameter of the reactor. To the resulting mixture is added aqueous ammonia to adjust the pH value of 9.5, then the mixture is allowed to stand at room temperature for 4 hours. The resultant is filtered and washed, followed by drying with a spray dryer to obtain white fine particles.

Example 7

Methyl trichlorosilane is mixed with methyltrimethoxysilane to prepare a mixed solution in which the content of the methyl trichlorosilane is 500 ppm. To 280 g of the mixed solution is added 1,720 g of ion-exchanged water and mixed. The mixed solution is then transferred to a glass reactor equipped with a baffle plate and subjected to a mixing for 90 minutes at 90 rpm using a flat impeller having a width that is 60% of an inner diameter of the reactor. To the resulting mixture is added aqueous ammonia to adjust the pH value of 9.1, then the mixture is allowed to stand at room temperature for 4 hours. The resultant is filtered and washed, followed by drying with a spray dryer to obtain white fine particles.

Comparative Example 1

Methyl trichlorosilane is mixed with methyltrimethoxysilane to prepare a mixed solution in which the content of the methyl trichlorosilane is 500 ppm. To 280 g of the mixed solution is added 1,720 g of ion-exchanged water and mixed. The mixed solution is then transferred to a glass reactor and subjected to a mixing for 30 minutes at 70 rpm using a conventional anchor-shaped impeller. To the resulting mixture is added aqueous ammonia to adjust the pH value of 9.4, then the mixture is allowed to stand at room temperature for 4 hours. The resultant is filtered and washed, followed by drying with a spray dryer to obtain white fine particles.

Comparative Example 2

Methyl trichlorosilane is mixed with methyltrimethoxysilane to prepare a mixed solution in which the content of the methyl trichlorosilane is 500 ppm. To 280 g of the mixed solution is added 1,720 g of ion-exchanged water and mixed. The mixed solution is then transferred to a glass reactor and subjected to a mixing for 150 minutes at 150 rpm using a conventional anchor-shaped impeller. To the resulting mixture is added aqueous ammonia to adjust the pH value of 9.3, then the mixture is allowed to stand at room temperature for 4 hours. The resultant is filtered and washed, followed by drying with a spray dryer to obtain white fine particles.

Comparative Example 3

Methyl trichlorosilane is mixed with methyltrimethoxysilane to prepare a mixed solution in which the content of the methyl trichlorosilane is 50 ppm. To 280 g of the mixed solution is added 1,720 g of ion-exchanged water and mixed. The mixed solution is then transferred to a glass reactor and subjected to a mixing for 30 minutes at 70 rpm using a conventional anchor-shaped impeller. To the resulting mixture is added aqueous ammonia to adjust the pH value of 9.3, then the mixture is allowed to stand at room temperature for 4 hours. The resultant is filtered and washed, followed by drying with a spray dryer to obtain white fine particles.

Comparative Example 4

Methyl trichlorosilane is mixed with methyltrimethoxysilane to prepare a mixed solution in which the content of the methyl trichlorosilane is 6,000 ppm. To 280 g of the mixed solution is added 1,720 g of ion-exchanged water and mixed. The mixed solution is then transferred to a glass reactor and subjected to a mixing for 30 minutes at 70 rpm using a conventional anchor-shaped impeller. To the resulting mixture is added aqueous ammonia to adjust the pH value of 9.4, then the mixture is allowed to stand at room temperature for 4 hours. The resultant is filtered and washed, followed by drying with a spray dryer to obtain white fine particles.

Comparative Example 5

Methyl trichlorosilane is mixed with methyltrimethoxysilane to prepare a mixed solution in which the content of the methyl trichlorosilane is 50 ppm. To 280 g of the mixed solution is added 1,720 g of ion-exchanged water and mixed. The mixed solution is then transferred to a glass reactor equipped with a baffle plate and subjected to a mixing for 30 minutes at 70 rpm using a flat impeller having a width that is 60% of an inner diameter of the reactor. To the resulting mixture is added aqueous ammonia to adjust the pH value of 9.5, then the mixture is allowed to stand at room temperature for 4 hours. The resultant is filtered and washed, followed by drying with a spray dryer to obtain white fine particles.

Comparative Example 6

Methyl trichlorosilane is mixed with methyltrimethoxysilane to prepare a mixed solution in which the content of the methyl trichlorosilane is 6,000 ppm. To 280 g of the mixed solution is added 1,720 g of ion-exchanged water and mixed. The mixed solution is then transferred to a glass reactor equipped with a baffle plate and subjected to a mixing for 30 minutes at 70 rpm using a flat impeller having a width that is 60% of an inner diameter of the reactor. The resulting mixture is converted into a high sticky gel and fine particles could not be obtained.

The physical properties of the fine particles obtained therefrom are measured as follow, and the results are shown in table 1.

(1) Average particle diameter and Monodispersity: The fine particles obtained from the above are dispersed in water. The particles over 1 μm are analyzed using a Beckman Coulter Multisizer, and the particles under 1 μm are analyzed using a Malvern Size Analyzer. The monodispersity is determined by C.V. value calculated by dividing the standard deviation of the particle size by the mean size.

(2) Diffusion Efficiency: 100 parts by weight of polystyrene resin, 1 part by weight of EXL-5136 (product name of Rohm & Hass Co.) and 1 part by weight of fine particles obtained from the Examples and Comparative Examples are mixed through a twin screw extruder with Φ=45 mm to prepare a product in pellet form, respectively. The pellets are molded into test specimens in the form of flat plate having a thickness of 1.5 mm using a 10 oz injection molding machine at 210° C. The transmittance and the haze are measured using the flat plate.

(3) Luminance and Light resistance: The luminance is measured using the flat plate obtained from the above. The light resistance is determined by measuring the initial YI by means of a calorimeter and repeatedly measuring the YI value after UV irradiation for 24 hours. The light resistance is evaluated by calculating the difference (ΔYI).

TABLE 1

| | | Average Particle Diemeter (μm) | C.V. (%) | Transmittance (%) | Haze (%) | Luminance ($Cd/M^2$) | YI (a.u.) | ΔYI (a.u.) |
|---|---|---|---|---|---|---|---|---|
| Example | 1 | 1.79 | 18.8 | 59.1 | 93.1 | 2,650 | 1.3 | 25.5 |
| | 2 | 3.44 | 9.58 | 59.9 | 93.1 | 2,754 | 0.6 | 22.4 |
| | 3 | 4.56 | 13.1 | 61.2 | 93.0 | 2,780 | 0.5 | 23.3 |
| | 4 | 0.53 | 15.1 | 58.5 | 93.2 | 2,601 | 1.9 | 26.3 |
| | 5 | 0.47 | 12.0 | 58.6 | 93.2 | 2,603 | 1.8 | 26.1 |
| | 6 | 2.70 | 7.8 | 59.5 | 93.1 | 2,711 | 0.9 | 22.9 |
| | 7 | 5.07 | 9.1 | 61.9 | 93.0 | 2,810 | 0.3 | 23.7 |
| Comparative Example | 1 | 5.81 | 12.3 | 62.3 | 93.0 | 2,830 | 0.2 | 24.0 |
| | 2 | 4.67 | 11.0 | 61.3 | 93.0 | 2,800 | 0.4 | 23.2 |
| | 3 | 6.72 | 14.5 | 64.1 | 92.9 | 2,865 | 0.1 | 24.1 |
| | 4 | 5.34 | 8.9 | 62.1 | 93.0 | 2,822 | 0.3 | 23.9 |
| | 5 | 4.60 | 11.3 | 61.0 | 93.0 | 2,790 | 0.4 | 23.5 |
| | 6 | no fine particles | | | | | | |

As shown in Table 1, Examples 1 to 7 may obtain fine particles of 0.1 to 10 μm in a short time with ease by controlling the process conditions. The light diffuser plate which employs polymethylsilsesquioxane fine particles having an average particle size of 2.5 to 3.5 μm as light diffuser shows good diffusion and luminance properties. Examples 2 and 6 also show good YI and light resistance Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A method of preparing polyorganosilsesquioxane fine particles, comprising the steps of:
   (a) preparing a mixture comprising an organotrialkoxysilane and an organochlorosilane to give a concentration of the organochlorosilane in the mixture of about 100 to about 2,000 ppm;
   (b) mixing the mixture with water by means of a high-efficiency mixer selected from the group consisting of a homo-mixer, a homogenizer, a microfluidizer, a flat impeller having a width that is at least 50% of an inner diameter of a reactor, stirring equipment having a plurality of baffle plates oriented in a longitudinal direction of a reactor and combinations thereof to prepare a sol solution; and
   (c) maintaining a pH value of the sol solution within a range of about 8 to about 11.

2. The method of claim 1, wherein said organotrialkoxysilane is represented by the following chemical Formula (I):

$$R^1Si(OR^2)_3 \quad (I)$$

wherein $R^1$ represents an alkyl group having 1 to 6 carbon atoms, vinyl group, or aryl group, and $R^2$ is an alkyl group having 1 to 5 carbon atoms.

3. The method of claim 2, wherein said sol solution comprises said organotrialkoxysilane in an amount of about 5 to about 50% by weight based on the total weight of the sol solution.

4. The method of claim 1, wherein said organochlorosilane is represented by the following chemical Formula (II):

$$R^1Si(OR^2)_{3-x}Cl_x \qquad (II)$$

wherein $R^1$ represents an alkyl group having 1 to 6 carbon atoms, vinyl group, or aryl group, $R^2$ is an alkyl group having 1 to 5 carbon atoms, and x is 1 to 3.

5. The method of claim 1, wherein said organochlorosilane is organotrichlorosilane.

6. The method of claim 1, further comprising the steps of filtering said sol solution, washing and drying after step (c) to thereby obtain fine particles having an average particle diameter of about 0.1 to about 10 μm.

7. The method of claim 1, wherein the step of mixing the mixture with water comprises mixing the mixture with water using a homo-mixer.

8. The method of claim 1, wherein the step of mixing the mixture with water comprises mixing the mixture with water using a microfluidizer.

9. The method of claim 1, wherein the step of mixing the mixture with water comprises mixing the mixture with water using a homo-mixer and a microfluidizer.

10. The method of claim 1, wherein the step of mixing the mixture with water comprises mixing the mixture with water using a flat impeller having a width that is at least 50% of an inner diameter of a reactor.

11. The method of claim 1, further comprising the steps of filtering said sol solution, washing and drying after step (c) to thereby obtain fine particles having an average particle diameter of about 2.5 to about 3.5 μm.

* * * * *